April 6, 1965 R. C. FISCHER 3,176,526
SIFTERS
Filed June 9, 1961
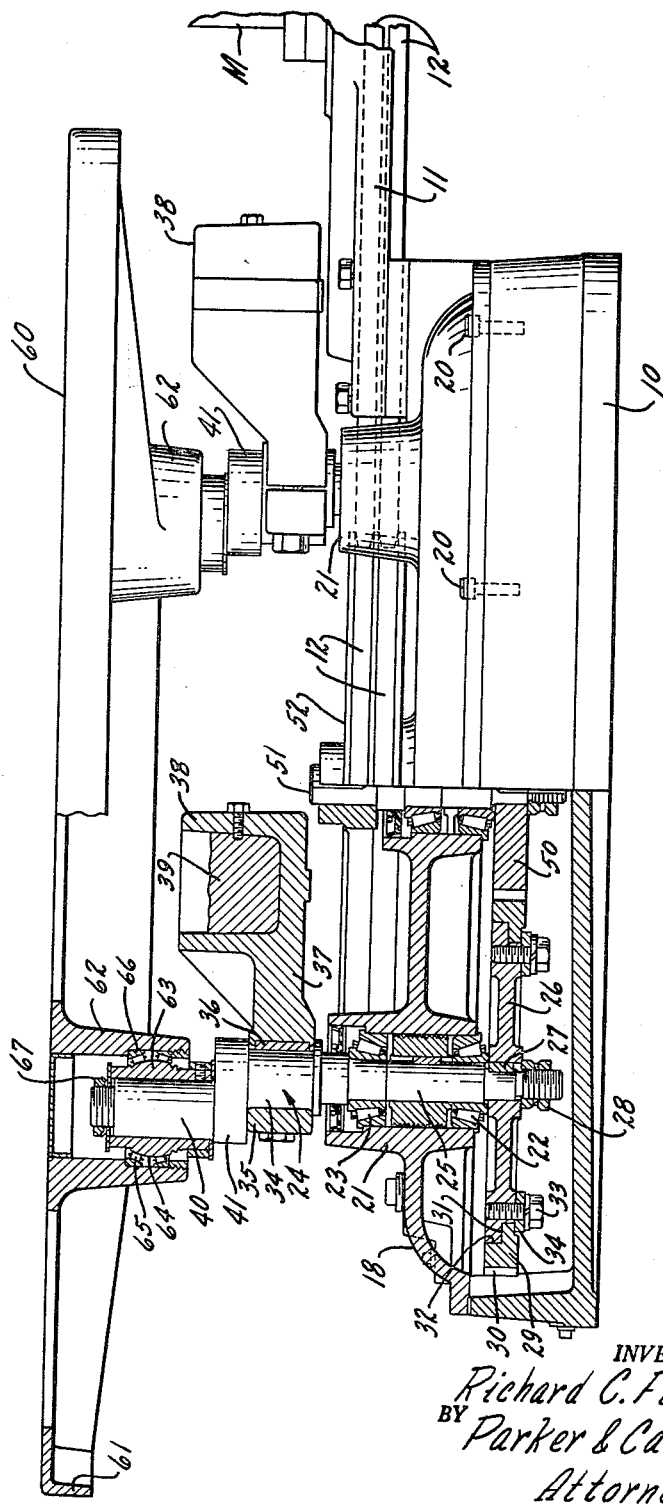
INVENTOR.
Richard C. Fischer,
BY Parker & Carter
Attorneys.

3,176,526
SIFTERS
Richard C. Fischer, Addison, Ill., assignor, by mesne assignments, to Blaw-Knox Company, Pittsburgh, Pa., a corporation of Delaware
Filed June 9, 1961, Ser. No. 116,142
4 Claims. (Cl. 74—86)

The present application is a continuation-in-part of application Serial No. 319,923, filed on November 12, 1952.

My invention is in the field of sifting or mixing equipment in which, for example, masses of finely divided particles are sifted by rotary agitation.

A primary object of the invention is to provide a drive mechanism and motion transmitting mechanism for imparting uniform rotary motion, for example, in a horizontal plane, to an object or body of material or particles positioned on a platform.

Another object is to provide a mechanism for imparting uniform rotary motion, in a predetermined plane, to a working platform, so that the platform will be given a true circular movement in a generally horizontal plane, regardless of the distribution of load on the platform, such movement being uniform throughout the area of the platform.

Another object of my invention is a new and improved mechanism that will entirely support the working platform and the load carried thereby so that the platform will be supported from the drive and will not have a direct mechanical connection to the base or casing of the drive mechanism other than a floating crank connection.

Another object of my invention is a rotary drive mechanism in which all vibration from the base is eliminated by proper counterweighting and balancing of several elements of the drive mechanism.

Other objects will appear from time to time in the course of the specification and claims.

I illustrate my invention more or less diagrammatically in the accompanying drawings wherein:

The figure is a side elevation with parts in vertical section.

Like parts are indicated by like symbols throughout the specification and drawings.

Referring to the drawings, a base 10 is shown having a lateral extension or bracket 11 upon which is mounted any suitable motor means, such as an electric motor, diagrammatically indicated at M. Any suitable motor means may be employed. The motor may have any suitable shaft and pulley, not indicated in detail, about which pass a belt or belts 12. The base 10 also supports any suitable housing or cover assembly 18 removably secured by suitable screws 20. The cover plate 18 is shown as including a sleeve 21 within which are located shaft bearing assemblies 22 and 23. Rotating within these bearing assemblies are a plurality of crankshafts, one being generally indicated at 24. It will be understood that a plurality of bearing assemblies and crankshafts are employed, four being a suitable number. For convenience, only one is shown in detail and only one will be described. Each crankshaft 24 includes a lower portion 25 which rotates within the bearing assemblies 22 and 23. Below the bearing assemblies a gear assembly is secured which includes a central hub member 26 which may be keyed to the lower shaft portion, as at 27. It may be secured, for example, by the lock nut assembly 28. Engaging the periphery of each hub member 26 is a ring gear 29 with its exterior gear teeth 30. 26 and 29 are shown as abutting at the opposed flat surfaces 31 and the cylindrical surfaces 32, the parts being secured together by gear bolts 33 engaging ring washers 34. It will be understood that the ring gear members 29 may be precisely adjusted, and, when properly adjusted, may be locked firmly in adjusted position. A suitable counterweight assembly is illustrated as positioned above the top of the cover plate 18. It includes, for example, a collar 35 keyed to an intermediate portion of the shaft 34, as at 36. From the collar 35 extends the arm 37 with its upwardly open cup 38 in which any suitable counterweight body, such as a body of lead 39, may be positioned. Offset from the lower crankshaft portion 25 is an upper crank pin 40 connected to the lower part of the crankshaft 24 by a suitable crank arm portion 41. The axis of each crank pin 40 is precisely parallel to the axis of its associated lower crankshaft portion 25. The radial separation between such axes is precisely identical for all of the crankshafts. As a matter of fact, the axes of all the crankshafts and all the crank pins are as precisely parallel as possible. Preferably, the entire crank arm structure is formed as a single piece, permitting it to be machined to precise accuracy.

The purpose of the above described drive is to impart a uniform, rotary, truly circular movement to a suitable platform or agitated member, for example, as shown at 60 in the figure, while preventing or avoiding any lateral stress to the platform by the crank pins. It is essential that the synchronization of the crankshafts be, to the highest degree, precise and that the crank pins at all times bear the same spatial relationship to each other. Assuming the employment of four of the crankshafts 24, each with its ring gear 29, the four gears, and thus the four crankshafts, are driven in precise synchronization by the following structure: A drive gear 50 is mounted on any suitable upright shaft 51 which carries in its upper portion belt pulleys 52 about which pass the belts 12. The shaft 51 is supported by suitable bearing means on the cover assembly 18. Thus when the motor means are energized the drive gear 50 is driven at a predetermined speed. Meshing with it at various points about its periphery are the individual ring gears 29. By the adjustment of these ring gears on their hubs the precise synchronization of the shafts 24 is obtained and the desired uniform spacing pattern of the crank pins is maintained. The crank pins 40 being in uniform relation to each other, any desired supported structure may be placed on them without development of any lateral stresses or strains, and without any distortion of the supported platform.

As an example of a platform or support which may be used I illustrate a generally plane surface support 60 which may have a surrounding reinforcing flange 61 and a plurality of bearing hubs or bearing sleeves 62. For convenience, the platform may be generally rectangular. Such sleeves may be made as separate attachments or, as shown herein, they may be made integral with the platform 60. I find it preferable, in connection with maintaining the precise synchronization of the crank arms and pins, and to insure an absence of lateral thrust against the platform 60, to employ a self-aligning bearing assembly between each crank pin 40 and its appropriate sleeve 62. Thus in the figure I illustrate an inner sleeve 63 having a somewhat spherical outer surface 64. Roller bearings 65 are illustrated opposed to appropriately shaped supporting bearing rings 66. The sleeve 63 may be held in position, for example, by any suitable locking assembly 67.

To summarize the above described structure as shown in the drawings, a single drive gear 50 is in simultaneous mesh with the individual adjustable gear rings 29 of the various crankshafts 24. I thus provide a uniform simultaneous drive directly from the drive gear 50 for each crankshaft 24. The provision of adjustable ring gears 29 for each crankshaft permits a very precise setting of the crank arms 41 and the crank pins 40, whereby, as the crank arms rotate, the pins are precisely uniformly spaced from each other at all positions of rotation in a predetermined spacing pattern. In practice, the employment of a self-aligning bearing assembly between each crank pin and the platform 60 further helps in preventing any lateral thrust of the crank pins against the platform. The platform merely floats on the crank pins. Their position is completely determined by their synchronizing drive. The platform plays no part whatsoever in maintaining the relative position or spacing of the crank pins.

The working platform 60 may have any dimension, size, or configuration desired. It may support any suitable structures, not herein shown, such as sieves, or the like. Whatever is positioned on the platform 60 will be subjected to a true circular rotary motion in a generally horizontal plane. This rotary motion will be uniform throughout the surface of the platform or of any parts positioned on the platform. Any object secured to the working platform will describe a circle which has a diameter of twice the distance between the centers of rotation of the shafts 24 and the crank pins 40. The speed of the prime mover or motor can be closely regulated, and the platform can thus be rotated at any desired speed, depending upon the particular sifting, grading or separating operation to be carried out. The counterweights are disposed generally opposite to the direction of eccentricity of the crank pins 40 to reduce vibration to a minimum, and to assure uniform circular motion. In this connection it is advantageous to position the counterweights between the lower crankshaft bearings on the cover plate 18 and the platform bearings about the crank pins 40.

It will be realized that whereas I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

The use and operation of the invention are as follows:

In sifter use I find that it is exceedingly important to maintain a true circular motion throughout the area of the sifter. In prior art sifters the maintenance of the desired uniform circular motion has not been obtained. In practice the path of movement of any given spot on a sifter platform or screen tends to vary and to become elliptical or oval. An elliptical or oval path is less efficient for sifting, and a circular path is ideal. The development of the present structure was made in order to provide the ideal truly circular motion and to make it uniform throughout the platform. It was determined, in the course of the development of the machine, that no stress should be put on the platform itself and that the platform should not be used to maintain the synchronization or angular adjustment of the driving cranks and pins. My experience established that if any strains or stresses are put on the platform itself the result is a rapid failure, for example, by breakage of the platform or driving parts. Hence the primary necessity of providing a plurality of actuating supports for the platform which are precisely synchronized and are maintained precisely in their desired angular and spatial relationship without any cooperation from the platform. The platform merely rides on the driving pins and has no influence whatsoever on the spacing or positioning or angular adjustment of the pins. With reference, for example, to the figure of the drawings, each crank is individually driven from a single central master gear. The master gear meshes with the teeth of the gear rings of the individual chrankshafts. As shown in the figure, each central gear element 26 is keyed to or mounted for movement unitarily with one of the crankshafts 24. At the factory a very precise initial adjustment is made. Since there is an individual path of drive from the synchronizing master gear to each crankshaft, wear is uniform, and in the normal use of the device no change takes place in the spacing or relationship or angular displacement of the crank pins. They are precisely synchronized and precisely set and maintain their spacing without putting any lateral strains on the platform 60 or any supporting part thereof.

I claim:

1. A high speed separating or agitating device for imparting true circular motion in a horizontal plane to a bodily rigid material carrying support member such as a platform or the like, said device providing true circular motion to the carried material irrespective of the load distribution on the bodily rigid material carrying support member, said device including:
   a base,
   a plurality of vertical shaft assemblies mounted on the base for rotation with respect thereto,
   each of said shaft assemblies including a rigid shaft having a crank arm,
   each of said shafts being in axial parallelism with other like shafts in a condition of no load, the rigidity of the shafts eliminating destructive shaft wobble under load conditions, including irregular loading,
   a bodily rigid material carrying support member,
   structure for connecting the support member to each of the shaft assemblies for floating movement thereon,
   said structure including
   firstly, a support member supporting pin carried by each crank arm and
   secondly, self-aligning bearing means for rotably connecting each pin to the said support member in driving engagement therewith from beneath to thereby enable the support member to float on the pins,
   said shaft assemblies thereby performing the dual function of supporting and driving the support member without wobble from locations entirely beneath the upper ends of the pins,
   drive means for imparting true circular motion to the support member,
   said means including a direct drive power system comprising a plurality of direct drive power transmission means extending from a common power point to each of the support member supporting and driving shaft assemblies,
   the length of the path defined by each direct drive power transmission means from the common power point to its associated point of application to the bodily rigid support member being equal, and
   a support member counterweight carried by each shaft assembly, the total counterweighting effect of the counterweights tending to counterbalance the support member mass eccentric to the axes of said shaft assemblies.

2. The high speed separating or agitating device of claim 1 further characterized in that the direct drive power transmission means includes drive gear means, and
   a plurality of driven gears,
   said drive gear means being in driving contact with the driven gears.

3. The high speed separating and agitating device of claim 1 further characterized
   firstly, in that the direct drive power transmission means includes
   an even number of driven gears, and
   secondly, in that the shaft assemblies are identically spaced from one another.

4. The high speed separating or agitating device of claim 1 further including base bearing means between the shaft assemblies and the base, and further characterized in that
  each counterweight is operatively connected to its associated shaft assembly at a location between the base bearing means and the support member bearing means.

References Cited by the Examiner

UNITED STATES PATENTS

| | | | |
|---|---|---|---|
| 1,228,265 | 5/17 | Unger | 74—447 |
| 1,241,954 | 10/17 | Furtado | 209—332 |
| 1,415,568 | 5/22 | Hryniewich | 209—332 |
| 1,629,314 | 5/27 | Schein | 74—595 |
| 2,065,509 | 12/36 | Bell et al. | 74—595 |
| 2,349,240 | 5/44 | Aiman | 74—665 |
| 2,395,537 | 2/46 | Crosby | 51—170 |
| 2,637,366 | 5/53 | Ashworth | 74—86 X |
| 2,669,812 | 2/54 | Champayne | 51—170 |

FOREIGN PATENTS

| | | |
|---|---|---|
| 8,119 | 5/89 | Great Britain. |
| 13,930 | 7/95 | Great Britain. |

BROUGHTON G. DURHAM, *Primary Examiner.*